United States Patent
Yeates

(10) Patent No.: US 12,190,623 B2
(45) Date of Patent: Jan. 7, 2025

(54) HIGH-RESOLUTION AND HYPERSPECTRAL IMAGING OF SKIN

(71) Applicant: L'OREAL, Paris (FR)

(72) Inventor: Kyle Yeates, Redmond, WA (US)

(73) Assignee: L'Oreal, Paris (FR)

( * ) Notice: Subject to any disclaimer, the term of this patent is extended or adjusted under 35 U.S.C. 154(b) by 614 days.

(21) Appl. No.: 17/138,310

(22) Filed: Dec. 30, 2020

(65) Prior Publication Data
US 2021/0201008 A1 Jul. 1, 2021

Related U.S. Application Data

(60) Provisional application No. 62/955,829, filed on Dec. 31, 2019.

(51) Int. Cl.
*G06V 40/10* (2022.01)
*G06Q 30/0601* (2023.01)
(Continued)

(52) U.S. Cl.
CPC ......... *G06V 40/10* (2022.01); *G06Q 30/0631* (2013.01); *G06T 7/70* (2017.01); *G06T 7/80* (2017.01); *H04N 23/56* (2023.01)

(58) Field of Classification Search
CPC ........ G16H 50/20; G16H 40/67; G16H 10/60; G16H 50/70; A61B 5/0077; A61B 5/445; A61B 5/0022; A61B 5/6898; A61B 5/7267; A61B 5/444; A61B 5/441; A61B 2562/0219; G06T 2207/30088; G06T 2207/10024; G06T 2207/20081; G06T 2207/20084; G06T 7/0016;
(Continued)

(56) References Cited

U.S. PATENT DOCUMENTS 6,571,003 B1 * 5/2003 Hillebrand ............. A61B 5/442
 382/118
11,348,334 B1 * 5/2022 MacEwen ............ G06V 10/426
(Continued)

FOREIGN PATENT DOCUMENTS

EP 3624043 A1 11/2020
WO WO-2014172671 A1 * 10/2014 ........... A61B 5/0077
(Continued)

OTHER PUBLICATIONS

International Search Report and Written Opinion of the International Searching Authority mailed Apr. 12, 2021, issued In corresponding International Application No. PCT/US2020/067554, filed Dec. 30, 2020, 11 pages.

(Continued)

*Primary Examiner* — Chan S Park
*Assistant Examiner* — Woo C Rhim
(74) *Attorney, Agent, or Firm* — CHRISTENSEN O'CONNOR JOHNSON KINDNESS PLLC

(57) ABSTRACT

Examples of the present disclosure relate to systems and methods for providing more accurate skin assessments. These assessments can be used to produce custom recommendations that are tailored for the user's skin. Additionally, these example methods address privacy concerns of users, as its small focal distance, limited depth of field, and narrow field of view mean it can only image skin, and not the full face or body.

8 Claims, 5 Drawing Sheets

(51) Int. Cl.
*G06T 7/70* (2017.01)
*G06T 7/80* (2017.01)
*H04N 23/56* (2023.01)

(58) Field of Classification Search
CPC ............. G06T 2207/30196; G06T 7/70; G06T 2207/10016; G06T 2207/30201; G06T 7/0014; G06T 2210/41; G06T 2207/10048; G06T 2207/30004; G06T 7/0012; G06T 2207/10152; G06T 7/80; G06V 40/10; G06V 10/143; G06V 10/141; G06V 40/16; G06Q 30/0631; H04N 23/56

See application file for complete search history.

(56) References Cited

U.S. PATENT DOCUMENTS

| | | | | |
|---|---|---|---|---|
| 2011/0213253 | A1* | 9/2011 | Kruglick | A61B 5/444 382/128 |
| 2013/0215275 | A1* | 8/2013 | Berini | G06V 10/993 348/150 |
| 2013/0236074 | A1* | 9/2013 | Hillebrand | G01J 3/52 382/128 |
| 2014/0313303 | A1* | 10/2014 | Davis | A61B 5/68 348/77 |
| 2015/0044098 | A1* | 2/2015 | Smart | A61B 5/0084 422/82.05 |
| 2015/0124067 | A1* | 5/2015 | Bala | A61B 5/0803 348/77 |
| 2015/0287191 | A1* | 10/2015 | Koruga | A61B 5/444 382/128 |
| 2015/0313532 | A1* | 11/2015 | Marinkovich | A61B 5/486 600/306 |
| 2017/0303790 | A1* | 10/2017 | Bala | G06T 7/11 |
| 2017/0340267 | A1* | 11/2017 | Shen | G16H 40/67 |
| 2018/0054565 | A1* | 2/2018 | Smith | H04N 23/80 |
| 2018/0204051 | A1* | 7/2018 | Li | G06F 18/24143 |
| 2018/0285952 | A1* | 10/2018 | Lu | B01F 29/10 |
| 2019/0371074 | A1* | 12/2019 | Pintaric | H04N 23/6812 |
| 2020/0020011 | A1* | 1/2020 | Harvill | G06Q 30/0621 |
| 2020/0121245 | A1* | 4/2020 | Barclay | A61B 5/743 |
| 2020/0261016 | A1* | 8/2020 | Baker | A61B 5/1032 |
| 2020/0364327 | A1* | 11/2020 | Shute | G06F 3/017 |
| 2020/0394384 | A1* | 12/2020 | Singh | G06V 40/10 |
| 2021/0056292 | A1* | 2/2021 | Mao | G06N 3/045 |
| 2021/0142888 | A1* | 5/2021 | Adiri | G16H 15/00 |
| 2021/0319709 | A1* | 10/2021 | Rose | G06T 3/4015 |
| 2022/0005191 | A1* | 1/2022 | Connor | G06T 7/0012 |
| 2022/0012896 | A1* | 1/2022 | Bond | G06T 7/194 |

FOREIGN PATENT DOCUMENTS

| | | | | |
|---|---|---|---|---|
| WO | WO-2017173291 | A1 * | 10/2017 | ........... A61B 5/0059 |
| WO | WO-2018208044 | A1 * | 11/2018 | ............ G06F 17/00 |
| WO | WO-2019144247 | A1 * | 8/2019 | |

OTHER PUBLICATIONS

International Preliminary Report on Patentability and Written Opinion issued Jul. 5, 2022, in corresponding International Application No. PCT/US2020/067554, filed Dec. 30, 2020, 7 pages.

* cited by examiner

HIGH-RESOLUTION AND HYPERSPECTRAL IMAGING OF SKIN

CROSS-REFERENCE TO RELATED APPLICATIONS

This application claims the benefit of U.S. Provisional Application No. 62/955,829, filed Dec. 31, 2019, the disclosure of which is incorporated herein in its entirety.

TECHNICAL FIELD

Embodiments of the present disclosure relate to image processing. In some embodiments, such image processing techniques are employed for skin condition detection and/or treatment.

SUMMARY OF THE DISCLOSURE

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present disclosure, a method is provided for assessing skin of a subject. In an embodiment, the method includes capturing, by a mobile device, one or more images of an area of interest at a distance D from the subject; capturing inertial measurement data of the mobile device contemporaneously with image capture; analyzing the captured images based on the inertial measurement data to determine location data, the location data representative of the location within the area of interest conveyed by each image at image capture; and analyzing the one or more images to determine one or more skin conditions associated with the area of interest.

In any embodiment, the method may further comprise generating a body map associated with the area of interest, the body map indicative of one or more skin conditions in relation to the location data.

In any embodiment, the capturing, by a mobile device, one or more images of an area of interest at a distance D from the subject includes capturing the one or more images at visible and non-visible wavelengths for permitting hyperspectral image processing.

In any embodiment, the method may further comprise emitting light, by a light source, at visible and non-visible wavelengths during image capture.

In any embodiment, the method may further comprise recommending a product for treatment of the one or more skin conditions.

In any embodiment, the capturing, by a mobile device, one or more images includes scanning, with the mobile device, the area of interest for skin assessment.

In any embodiment, the method may further comprise controlling a light source to provide multiple lighting conditions.

In any embodiment, the method may further comprise controlling light emissions from a plurality of regions of a lighting source; and conducting shadow analysis of the captured images to associate a topography with the area of interest.

In any embodiment, the method may further comprise calibrating the mobile device by scanning the area of interest in a set pattern.

In accordance with an aspect of the present disclosure, a computing system is provided. In an embodiment, the system comprises an image capture device; a light source; one or more inertial sensors; and one or more processing engines including circuitry configured to: cause the image capture device to capture a plurality of images of the area of interest; process the images captured by the camera and the inertial measurement data generated by the inertial measurement unit (IMU) and to generate location data, the location data representative of the location within the area of interest conveyed by each image at image capture; analyze the images to produce skin condition data for determining one or more skin conditions; and generate a body map based on the location data and the skin condition data.

In accordance with an aspect of the present disclosure, a mobile device is provided. In an embodiment, the mobile device includes a camera configured to capture digital images of an area of interest; a light source associated with the camera and configured to illuminate the area of interest; an inertial measurement unit (IMU) configured for generating inertial measurement data; an image capture engine including circuitry configured to cause the camera to capture a plurality of images of the area of interest; an image analysis engine including circuitry configured to process the images captured by the camera and the inertial measurement data generated by the inertial measurement unit (IMU) and to generate location data, the location data representative of the location within the area of interest conveyed by each image at image capture.

In any embodiment, the mobile device may further comprise a skin condition engine including circuitry configured to analyze the images to produce skin condition data for determining one or more skin conditions.

In any embodiment, the one or more skin conditions are selected from the group consisting of acne, age spots, wrinkles, and sun spots.

In any embodiment, the skin condition engine further includes circuitry configured to generate a body map based on the location data and the skin condition data.

In any embodiment, the mobile device may further comprise a recommendation engine including circuitry configured to recommend a treatment protocol or a product for treating the one or more skin conditions conveyed by the body map.

In any embodiment, the recommendation engine further includes circuitry configured to track the efficacy of the recommendation.

In any embodiment, image analysis engine further includes circuitry to access visual landmarks associated with the subject to enhance the accuracy of the location data.

In any embodiment, the inertial measurement unit (IMU) includes one or more accelerometers, one or more gyroscopes, and a magnetometer.

In any embodiment, the camera and the light source are configured to operate at visible and non-visible wavelengths for hyperspectral imaging.

In any embodiment, the light source includes a plurality of regions, each region comprising a plurality of controllable LEDs that when controlled independently produce glancing angle photography for shadow analysis.

DESCRIPTION OF THE DRAWINGS

The foregoing aspects and many of the attendant advantages of disclosed subject matter will become more readily appreciated as the same become better understood by reference to the following detailed description, when taken in conjunction with the accompanying drawings, wherein.

DETAILED DESCRIPTION

Figure 1:
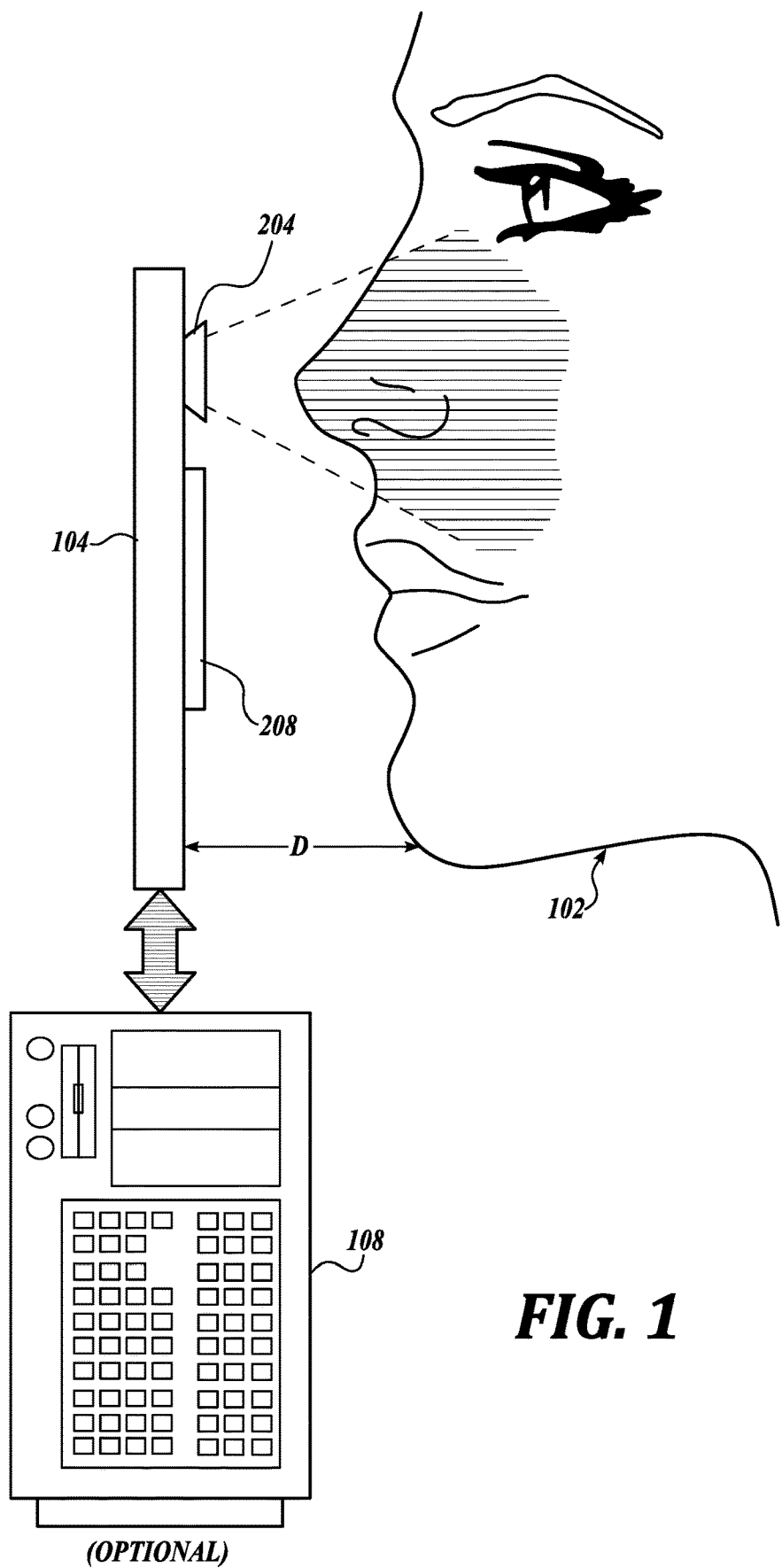
FIG. 1 is a schematic diagram that illustrates a non-limiting example of a system for imaging skin according to an aspect of the present disclosure.

Examples of methodologies and technologies for improved image capture for use in various applications, such as skin diagnosis, product selection, etc., are described herein. Thus, in the following description, numerous specific details are set forth to provide a thorough understanding of the examples. One skilled in the relevant art will recognize; however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Examples of the present disclosure relate to systems and methods for providing more accurate skin assessments. These assessments can be used to produce custom recommendations that are tailored for the user's skin. Additionally, these example methods address privacy concerns of users, as its small focal distance, limited depth of field, and narrow field of view mean it can only image skin, and not the full face or body.

In accordance with one or more aspects of the disclosure, the systems and methods can be implemented in or comprise a consumer device, such as a skin care appliance, a mobile phone, etc. In some examples, the consumer device incorporates a camera, a light ring for the camera, and an inertial measurement unit (IMU) for generating inertial measurement data. The IMU is composed of an accelerometer, an angular rate sensor (gyro), and a magnetometer (compass). In some examples, the camera lens is optimized to image the skin at a close distance (small focal distance, limited depth of field, narrow field of view). In some examples, the consumer device is configured such that the camera would remain at a relatively constant distance from the skin, and that the area of the skin the camera is imaging would be illuminated by the light ring. The camera and light ring are both capable of operating at visible and non-visible wavelengths, thereby allowing for hyperspectral imaging.

Because the consumer device is specifically designed to capture images close (e.g., about 0.5 inches to about 6 inches) to the skin of the subject, the inertial measurement data collected at the time of image capture in conjunction with optional marker data allow for a positional determination of the skin, as will be described in more detail below. Additionally, in some examples the regions of the light ring can be controlled independently to produce glancing angle photography thereby enabling shadow analysis for inference about the topography of the skin.

In use, the user scans their face/body with the consumer device in a pattern that covers all of the areas of interest that the user wishes to assess. Generally, this scanning routine is called an "imaging routine". During the imaging routine, the consumer device is capturing successive images (e.g., 2-10 frames per second, etc.) or video (e.g., 24 or 30 frames per second, etc.) of the skin using an array of conditions (e.g., multiple wavelengths, multiple lighting conditions, etc.) contemporaneously with recordation of the IMU data.

In some embodiments, the collected data and the captured images are fed into an image processing system on the consumer device or other portable device, such as a mobile phone, a tablet, etc. In some embodiments, the image processing system employs AI techniques and methodologies. The image processing system uses the IMU data to determine the position of the camera in relation to the user's body/face at image capture. The image processing system may also incorporate optical landmarks (e.g., birthmarks, freckles, bones, etc.) to enhance the positional data. The combination of data and the processing techniques allow for more accurate positional calculations than either of the data sets could provide alone. The collected data also allows for improved system accuracy when comparing images of the area of interest taken over time. In some embodiments, the collected data is used to normalize the images for subsequent skin treatment analysis.

If it is determined that such data is not sufficient to provide an accurate position of the area of interest, a training regimen could also be used. In this example, the user scans the areas of interest with the consumer device in a set pattern that helps the consumer device calibrate to that user's geometry and optical landmarks. In some examples, the data from this calibration routine would then be incorporated into the image processing algorithm to help refine positional calculations. The calibration routine can be repeated as desired.

Once the consumer device is able to determine its location in relation to the user's face/body during an imaging routine, the consumer device or associated processing system can then analyze the captured images for specific skin conditions/characteristics. From the positional data and the skin condition/characteristic data, a facial/body map can be created in some embodiments, in which the location and severity of skin factors is identified. Using this facial/body map, custom treatment protocols and/or products can be recommended that are tailored to the user's skin and/or sections thereof.

The systems and methods described herein can then track the efficacy of these recommendations in some embodiments and can alter them if needed to improve results. The systems and methods described herein allow for more accurate skin assessments than currently available consumer devices. These assessments enable the user to receive product/treatment recommendations that are tailored for their skin type and allow for tracking of their performance to ensure the user is receiving the optimal benefit from their beauty routine. If changes need to be made to their routine, the systems and methods described herein can identify what those changes are, and thus improve the user's skin outcomes, regardless of the condition/characteristic they are trying to improve.

In some examples, some methodologies and technologies of the disclosure are provided to a user as a computer application (i.e., an "App") through a mobile computing device, such as a smart phone, a tablet, a wearable computing device, handheld appliance, or other computing devices that are mobile and are configured to provide an App to a user. In other examples, the methodologies and technologies of the disclosure may be provided to a user on a computer device by way of a network, through the Internet, or directly through hardware configured to provide the methodologies and technologies to a user.

FIG. 1 is a schematic diagram that illustrates a non-limiting example of a system 100 for providing a more accurate skin assessment to a subject according to various aspects of the present disclosure. In some embodiments, the system 100 may use the skin assessments for generating a recommendation for cosmetic products and/or treatment protocols/regimens. For example, such cosmetic products (e.g., cosmetic formulas, such as creams, lotions, balms, etc., with or without medicaments) may be applicable for acne, wrinkles, dry patches, dark spots, etc., or any other beauty or health condition applicable to the skin.

In the system 100, a user 102 interacts with a mobile computing device 104. In one example, the mobile computing device 104 is used to capture one or more images of the user 102 via a camera 204. In some embodiments, the camera 204 is positioned so that the image captured is only of skin, and not the full face or body. A lighting source, such as a ring light 208, can be provided to improve the quality of the images captured by the mobile computing device 104. In some embodiments, the ring light comprises a number of LEDs. In some embodiments, each of the LEDs is controllable regarding illuminance or light intensity. In some embodiments, the camera 204 and the ring light 208 are configured to operate at visible and non-visible (e.g., IR, UV, etc.) wavelengths, thereby allowing for hyperspectral imaging.

Figure 6:
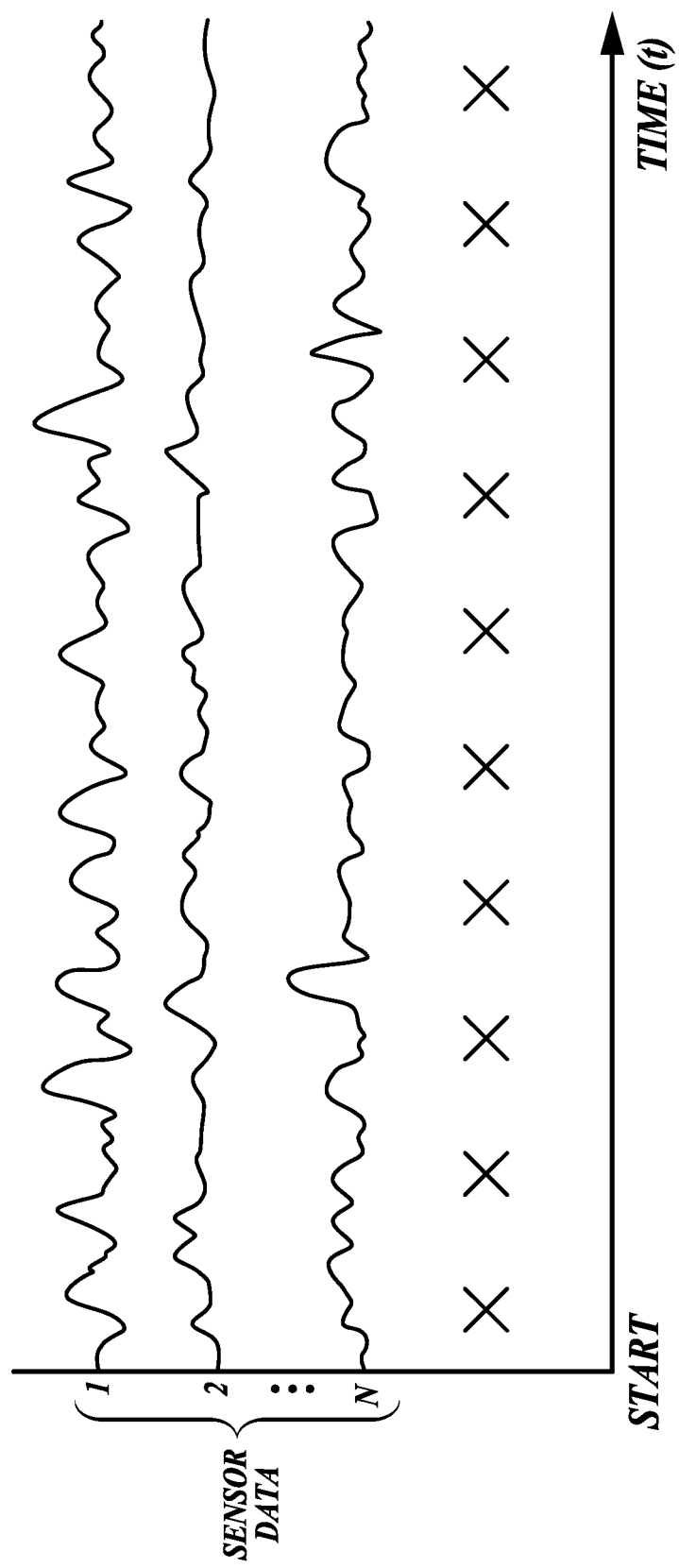
FIG. 6 is a schematic illustration showing continuous IMU data capture during image capture routine.

The mobile computing device 104 is also configured to provide inertial data at the time of image capture via an inertial measurement unit (IMU). In some embodiments, the IMU provides inertial measurement data by detecting linear acceleration using one or more accelerometers and rotational rate data using one or more gyroscopes. In some embodiments, the IMU also include a magnetometer, which can be used as a heading reference (e.g., compass). In an embodiment, the IMU includes one accelerometer, one gyro, and one magnetometer per axis of: pitch, roll and yaw. In this embodiment, the IMU generates at least nine channels of data. The IMU is configured in some embodiments to continuously generate data over time, as shown in FIG. 6.

In some embodiments, the mobile computing device includes a guide or other structure (not shown) to aid the user in holding the mobile computing device away from the skin a repeatable and nearly constant distance D.

In use, the user 102 carries out an imaging routine (e.g., scans their face/body with the mobile computing device 104 in a pattern that covers the areas of interest that the user wishes to assess). During the imaging routine, the consumer device is capturing successive images or video of the skin in multiple wavelengths, multiple lighting conditions, etc. contemporaneously with recordation of the IMU data.

The captured images and the recorded IMU data are then processed by an image processing algorithm. Processing can be carried out on the mobile computing device 104 or an associated device. In an embodiment, the mobile computing device 104 is configured to employ image processing algorithms on the captured images and the recorded IMU data to determine location data (e.g., where the image is located on the body, etc.) and skin condition data (e.g., skin characteristic data indicative of acne, age spots, wrinkles, dry spots, rashes, etc.). From the location data and the skin condition/characteristic data, a facial/body map can be generated by the image processing algorithms. The facial/body map is a collection of data that represents the location (e.g., precise location on the subject) and severity of skin conditions in the area of interest.

Using this facial/body map, the mobile computing device 104 can present treatment protocols and/or product recommendations that are tailored to the user's skin or sections thereof. The mobile computing device 104 can then track the efficacy of these recommendations in some embodiments, and can alter them if needed to improve results.

As will be described in more detail below, some of the functionality of the mobile computing device 104 can be additionally or alternatively carried out at an optional server computing device 108. For example, the mobile computing device 104 in some embodiments transmits the captured images and IMU data to the server computing device 108 via a network 110 for image processing (e.g., location determination, skin assessment, product recommendation, etc.) and/or storage. In some embodiments, the network 110 may include any suitable wireless communication technology (including but not limited to Wi-Fi, WiMAX, Bluetooth, 2G, 2G, 4G, 5G, and LTE), wired communication technology (including but not limited to Ethernet, USB, and FireWire), or combinations thereof.

For example, with the captured images received from the mobile computing device 104 and IMU data, the server computing device 108 may process the captured images and IMU data for location determination, skin assessment, product recommendation, etc., purposes and/or store the images for subsequent retrieval. In other embodiments, processed images are transmitted to the server computing device 108 for storage and/or further processing, such as skin assessment, product recommendation, etc. In some embodiments, the server computing device 108 can serve recommendation data to the mobile computing device 104 for local processing and/or display to the user.

Figure 2:
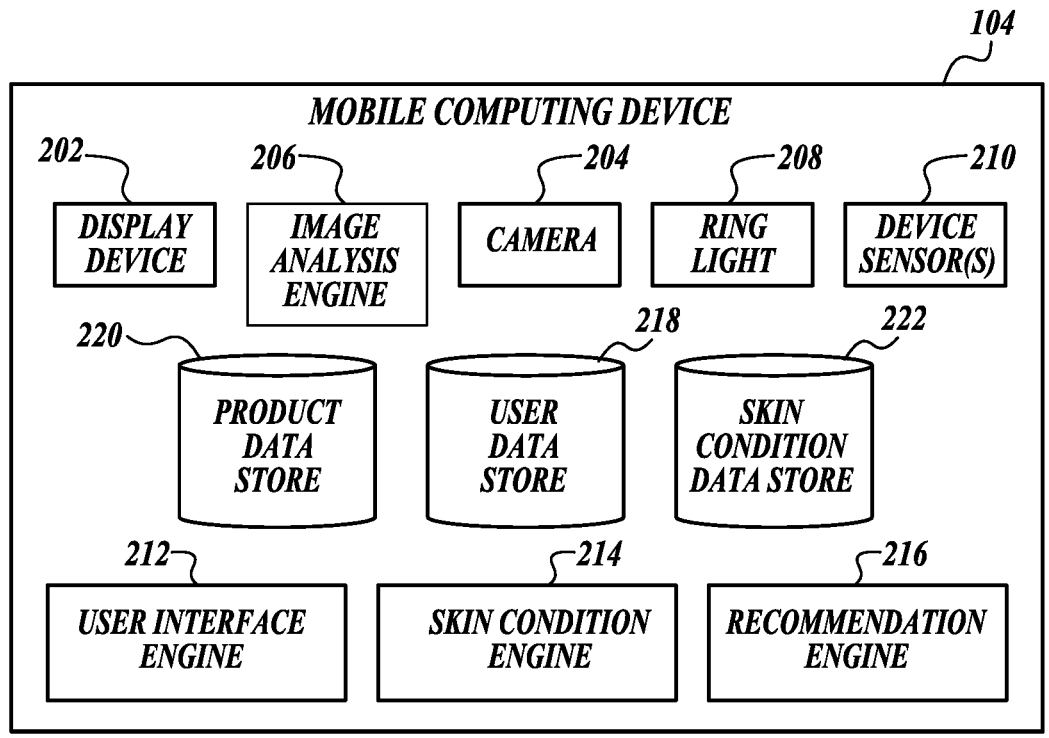
FIG. 2 is a block diagram that illustrates a non-limiting example of a mobile computing device according to various aspects of the present disclosure.

FIG. 2 is a block diagram that illustrates a non-limiting example of a mobile computing device 104 according to an aspect of the present disclosure. In some embodiments, the mobile computing device 104 may be a smartphone or handheld skin treatment appliance. In some embodiments, the mobile computing device 104 may be any other type of computing device having the illustrated components, including but not limited to a tablet computing device or a laptop computing device. In some embodiments, the mobile computing device 104 may not be mobile, but may instead by a stationary computing device such as a desktop computing device or computer kiosk. In some embodiments, the illustrated components of the mobile computing device 104 may be within a single housing. In some embodiments, the illustrated components of the mobile computing device 104 may be in separate housings that are communicatively coupled through wired or wireless connections (such as a laptop computing device with an external camera connected via a USB cable). The mobile computing device 104 also includes other components that are not illustrated, including but not limited to one or more processors, a non-transitory computer-readable medium, a power source, and one or more communication interfaces.

As shown, the mobile computing device 104 includes a display device 202, a camera 204, an image analysis engine 206, a light ring 208, IMU or device sensors 210, a user interface engine 212, a skin condition engine 214, a recommendation engine 216, and one or more data stores, such as a user data store 218, a product data store 220 and/or skin condition data store 222. Each of these components will be described in turn. In some embodiments, the display device 202 is an LED display, an OLED display, or another type of display for presenting a user interface. In some embodiments, the display device 202 may be combined with or include a touch-sensitive layer, such that a user 102 may interact with a user interface presented on the display device 202 by touching the display. In some embodiments, a separate user interface device, including but not limited to a mouse, a keyboard, or a stylus, may be used to interact with a user interface presented on the display device 202.

In some embodiments, the user interface engine 212 is configured to present a user interface on the display device 202. In some embodiments, the user interface engine 210 may be configured to cause the camera 204 to capture images of the user 102. Of course, a separate image capture engine may also be employed to carry out at least some of the functionality of the user interface 212. The user interface presented on the display device 202 can aid the user in capturing images, storing the captured images, accessing the previously stored images, interacting with the other engines, etc. In some embodiments, the user interface engine presents a user interface to the user for carrying out the imaging routine and/or set up routine described in other sections of the application.

In some embodiments, the camera 204 is any suitable type of digital camera that is used by the mobile computing device 104. In some embodiments, the mobile computing device 104 may include more than one camera 204, such as a front-facing camera and a rear-facing camera. In some embodiments, the camera 204 is configured to capture high resolution (e.g., 1-4 megapixels, 4-7 megapixels, 7-10 megapixels, or higher) images. In some embodiments, the camera 204 is configured to capture images at different wavelengths (e.g., IR, UV, Blue light, etc.) for hyperspectral imaging. The captured images can be stored in the user data store 218.

In some embodiments, the light ring 208 provides illumination of the skin during image capture by the camera 204. In some embodiments, the light ring 208 includes a plurality of regions, each region comprising a plurality of controllable LEDs. In some embodiments, the light ring 206 is configured to operate at different wavelengths and/or intensities. In some embodiments, regions of the light ring can be controlled independently via the user interface engine, for example, to produce glancing angle photography thereby enabling shadow analysis for inference about the topography of the skin.

Generally herein, any reference to images or video being utilized by the present disclosure, should be understood to reference both video, images (one or more images), or video and images (one or more images), as the present disclosure is operable to utilize video, images (one or more images), or video and images (one or more images) in its methods and systems described herein.

In some embodiments, the image analysis engine 206 is configured to process the images captured by the camera 204 along with inertial measurement data generated by the IMU or device sensors 210. In some embodiments, the image analysis engine 206 is configured to determine the location, orientation, etc., of the camera 204 in relation to the user's body/face at image capture based on the IMU data. The image analysis engine 206 may also access optical landmarks (e.g., birthmarks, freckles, bone features, etc.) from the user data store 218 to enhance the accuracy of the location data. In some embodiments, the image analysis engine 206 can employ AI techniques, such as a convolutional neural network, to detect relevant portions, relationships between portions, etc., of the image(s), in order to determine or identify the location of the body part conveyed by the image(s). In some embodiments, the image analysis engine 206 is configured to conduct shadow analysis of the images for inferences about the topography of the skin. Such topography inferences can assist in location accuracy, skin assessment, etc.

The resulting data from the processed images, the IMU data, and/or other data can then be stored in the user data store 218. The stored data can be subsequently used for product selection, skin assessment, recommendations, or for other purposes.

The mobile computing device 104 may be provided with other engines for increased functionality. For example, in the embodiment shown, the mobile computing device 104 includes a skin condition engine 214. The skin condition engine 214 is configured to analyze the images to determine one or more skin conditions (e.g., acne, age spots, wrinkles, sun spots, etc.) of the user 102. The skin condition engine 208 may retrieve data from the skin condition data store 222 during the analysis. In doing so, skin condition engine 214 may generate skin condition data (e.g., skin characteristic data indicative of acne, age spots, wrinkles, dry spots, rashes, etc.). In an embodiment, the skin condition engine 214 is configured to employ image processing techniques to generate a facial/body map based on the location data (e.g., the location of the body part conveyed by the images, such as the lower left side of the face, the right ear, the upper back proximate the scapula, lower left calf, etc.,) and the skin condition data (e.g., skin characteristic data indicative of acne, age spots, moles, wrinkles, dry spots, rashes, etc.). In some embodiments, the facial/body map is a collection of data that represents the location and severity of skin conditions within the area of interest. Again, the facial/body map, the underlying data, etc., can be stored in the user data store 218.

In some of these embodiments, a recommendation engine 216 may also be provided, which recommends a treatment protocol, products for treatment, etc., based on the results of the analysis carried out by the skin condition engine 214, including the facial/body map. In doing so, the recommendation engine 216 can access data from the product data store 220. For example, using the facial/body map, the recommendation engine 216 can present treatment protocols and/or product recommendations that are tailored to the user's skin. The recommendation engine 216 or other engines can then track the efficacy of these recommendations in some embodiments, and can alter them if needed to improve results. Any recommendation generated by the recommendation engine 216 can be presented to the user in any fashion via the user interface engine 212 on display device 202.

Further details about the actions performed by each of these components are provided below.

"Engine" refers to refers to logic embodied in hardware or software instructions, which can be written in a programming language, such as C, C++, COBOL, JAVA™ PHP, Perl, HTML, CSS, JavaScript, VBScript, ASP, Microsoft .NET™, Go, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or the functionality thereof.

"Data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 3:
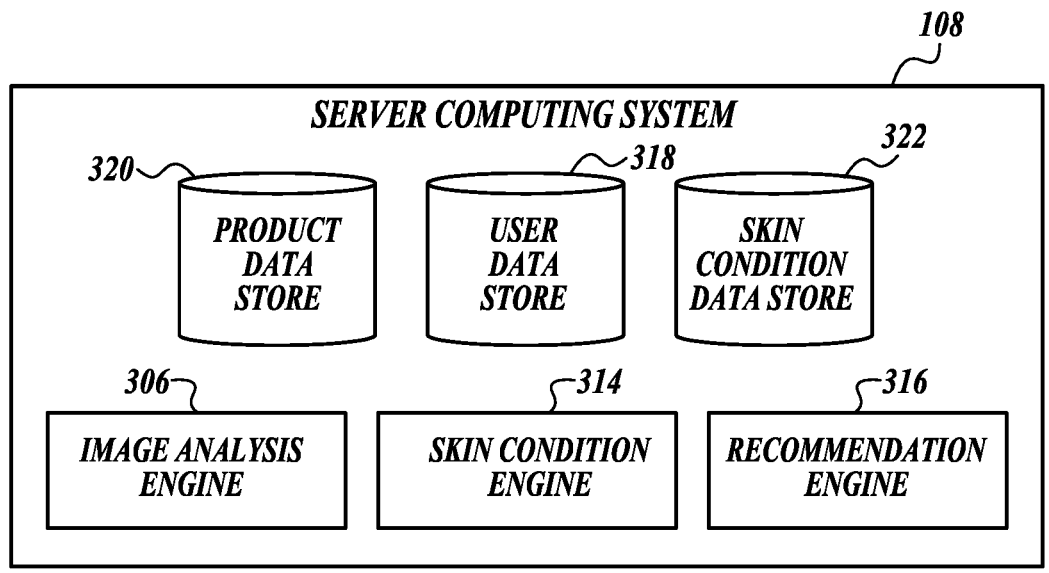
FIG. 3 is a block diagram that illustrates a non-limiting example of a server computing device according to an aspect of the present disclosure.

FIG. 3 is a block diagram that illustrates various components of a non-limiting example of an optional server computing system 108 according to an aspect of the present disclosure. In some embodiments, the server computing system 108 includes one or more computing devices that each include one or more processors, non-transitory computer-readable media, and network communication interfaces that are collectively configured to provide the components illustrated below. In some embodiments, the one or more computing devices that make up the server computing system 108 may be rack-mount computing devices, desktop computing devices, or computing devices of a cloud computing service.

In some embodiments, image processing and/or storage of the captured images and IMU data can be additionally or alternatively carried out at the optional server computing system 108. In that regard, the server computing system 108 can receive captured and/or processed images and IMU data from the mobile computing device 104 over the network 110 for processing and/or storage.

As shown, the server computing system 108 optionally includes an image analysis engine 306, a skin condition engine 314, a recommendation engine 316, and one or more data stores, such as a user data store 318, a product data store 320, and/or a skin condition data store 322. It will be appreciated that the image analysis engine 306, the skin condition engine 314, the recommendation engine 316, and the one or more data stores, such as the user data store 318, the product data store 320, and/or the skin condition data store 322 are substantially identical in structure and functionality as the image analysis engine 206, the skin condition engine 214, a recommendation engine 216, and the one or more data stores, such as the user data store 218, the product data store 220, and/or the skin condition data store 222 of the mobile computing device 104 illustrated in FIG. 2.

Figure 4:
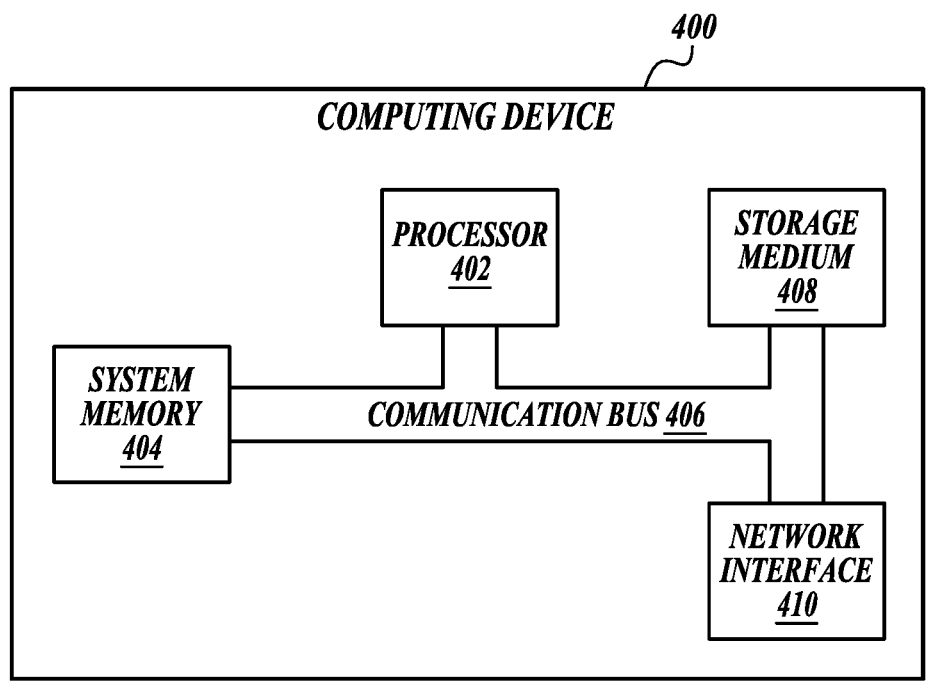
FIG. 4 is a block diagram that illustrates a non-limiting example of a computing device appropriate for use as a computing device with embodiments of the present disclosure.

FIG. 4 is a block diagram that illustrates aspects of an exemplary computing device 400 appropriate for use as a computing device of the present disclosure. While multiple different types of computing devices were discussed above, the exemplary computing device 400 describes various elements that are common to many different types of computing devices. While FIG. 4 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 400 may be any one of any number of currently available or yet to be developed devices.

In its most basic configuration, the computing device 400 includes at least one processor 402 and a system memory 404 connected by a communication bus 406. Depending on the exact configuration and type of device, the system memory 404 may be volatile or nonvolatile memory, such as read only memory ("ROM"), random access memory ("RAM"), EEPROM, flash memory, or similar memory technology. Those of ordinary skill in the art and others will recognize that system memory 404 typically stores data and/or program modules that are immediately accessible to and/or currently being operated on by the processor 402. In this regard, the processor 402 may serve as a computational center of the computing device 400 by supporting the execution of instructions.

As further illustrated in FIG. 4, the computing device 400 may include a network interface 410 comprising one or more components for communicating with other devices over a network. Embodiments of the present disclosure may access basic services that utilize the network interface 410 to perform communications using common network protocols. The network interface 410 may also include a wireless network interface configured to communicate via one or more wireless communication protocols, such as WiFi, 2G, 2G, LTE, WiMAX, Bluetooth, Bluetooth low energy, and/or the like. As will be appreciated by one of ordinary skill in the art, the network interface 410 illustrated in FIG. 4 may represent one or more wireless interfaces or physical communication interfaces described and illustrated above with respect to particular components of the computing device 400.

In the exemplary embodiment depicted in FIG. 4, the computing device 400 also includes a storage medium 408. However, services may be accessed using a computing device that does not include means for persisting data to a local storage medium. Therefore, the storage medium 408 depicted in FIG. 4 is represented with a dashed line to indicate that the storage medium 408 is optional. In any event, the storage medium 408 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data.

In this regard, the system memory 404 and storage medium 408 depicted in FIG. 4 are merely examples of computer-readable media.

Suitable implementations of computing devices that include a processor 402, system memory 404, communication bus 406, storage medium 408, and network interface 410 are known and commercially available. For ease of illustration and because it is not important for an understanding of the claimed subject matter, FIG. 4 does not show some of the typical components of many computing devices. In this regard, the computing device 400 may include input devices, such as a keyboard, keypad, mouse, microphone, touch input device, touch screen, tablet, and/or the like. Such input devices may be coupled to the computing device 400 by wired or wireless connections including RF, infrared, serial, parallel, Bluetooth, Bluetooth low energy, USB, or other suitable connections protocols using wireless or physical connections. Similarly, the computing device 400 may also include output devices such as a display, speakers, printer, etc. Since these devices are well known in the art, they are not illustrated or described further herein.

Figure 5:
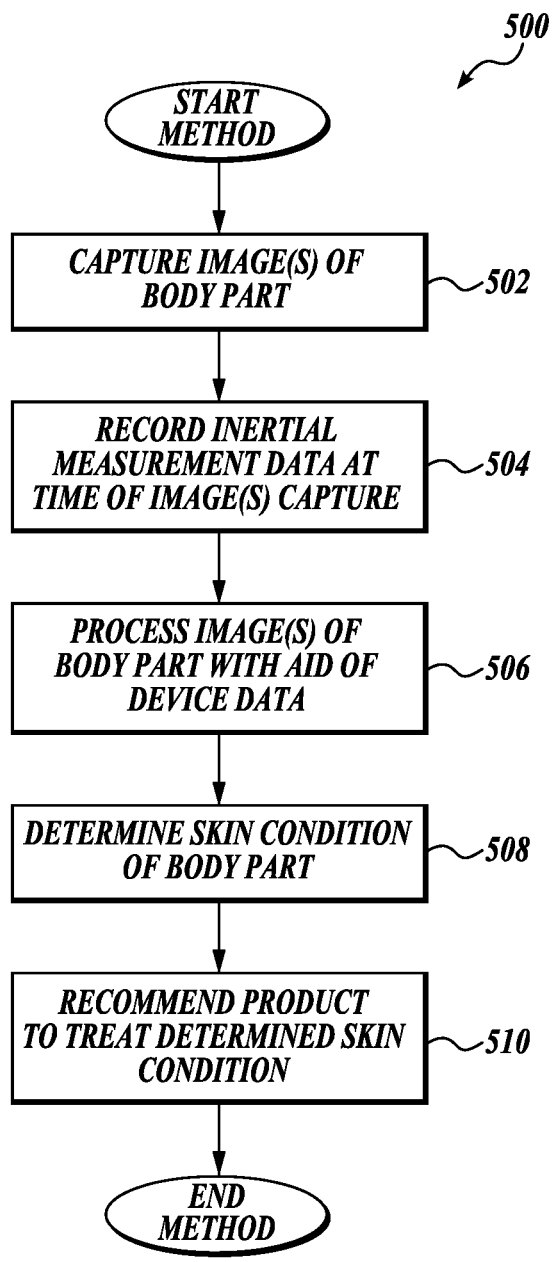
FIG. 5 is a flowchart that illustrates a non-limiting example of a method for imaging skin according to an aspect of the present disclosure.

FIG. 5 is a flowchart that illustrates a non-limiting example embodiment of a method 500 for assessing skin conditions of a user according to an aspect of the present disclosure. It will be appreciated that the following method steps can be carried out in any order or at the same time, unless an order is set forth in an express manner or understood in view of the context of the various operation(s). Additional process steps can also be carried out. Of course, some of the method steps can be combined or omitted in example embodiments.

From a start block, the method 500 proceeds to blocks 502 and 504, where one or more images are captured by the camera 204 of the mobile computing device 104 contemporaneously with IMU data. In some embodiments, the images captured are of an area of interest to the user 102. For example, the area of interest can be regions of one or more of the face, the neck, the arm, etc., for assessing skin conditions, such as sun spots, acne, eczema, rashes, dry skin, etc.

For example, the user can start an imaging routine via the user interface engine 212. Once started, the user scans their face/body (e.g., an area of interest for skin assessment) with the mobile computing device 104 in a pattern that covers all of the areas of interest that the user wishes to assess. In some embodiments, the camera 204 maintained at about a distance D from the skin of the area of interest. During the imaging routine, the camera 204 captures successive images (e.g., 2-10 frames per second, etc.) or video (e.g., 24 or 30 frames per second, etc.) of the skin. In some embodiments, the camera is capturing multiple images at difference wavelengths at each capture location for hyperspectral imaging. The mobile computing device 104 can also control the light ring 208 to provide multiple lighting conditions. FIG. 6 is an illustration showing the imagine routine, wherein multiple channels (1-N) of IMU is continuously generated along with images captured at discrete times (depicted with an X in FIG. 6).

In some examples, the user may scan the areas of interest with the consumer device in a set pattern for calibrating the mobile computing device 104 to that user's geometry and optical landmarks. This data can be stored in the user data store 218, 318 for subsequent retrieval.

Next, at block 506, the captured images and the IMU data are processed by, for example, the image analysis engine. For example, in some embodiments, the image analysis engine 206 of the mobile computing device 104 or the image analysis engine 306 of the server computing system 108 analyzes the captured images and IMU data to determine the precise location of each image in relation to the user's body. In other words, the captured images and IMU data are analyzed together to accurately identify where on the body of the subject each image is conveying. In some embodiments, the image analysis engine 206 employs AI techniques and methodologies for this determination. For example, the image analysis engine uses the IMU data to determine the position and orientation of the camera 204 in relation to the user's area of interest at image capture. In some examples, data from the calibration routine is accessed from the user data store 218, if available, and used by the image analysis engine to help refine location data calculations.

The processed data from block 506 can be stored in user data store 218. During storage, additional image processing (e.g., filtering, transforming, compressing, etc.) can be undertaken, if desired. Additionally or alternatively, the data can be transferred to the server computing system 108 over the network 110 for storage at the user data store 318.

Next, at block 508, one or more skin conditions are determined for regions of the area of interest. In some embodiments, the skin condition engine 214 of the mobile computing device 104 or the skin condition engine 314 of the server computing system 108 analyzes the images and determines, for example, acne, age spots, dry patches, etc., for each region of the area of interest. In doing so, the skin condition engine can access data from the skin condition data store 222, 322. As a result, skin condition/characteristic data is generated at block 508.

From the location data generated in, for example, block 506, and the skin condition/characteristic data, a facial/body map can be created in some embodiments, in which the location and severity of skin factors is identified. Again, the facial/body map, the underlying data, etc., can be stored in the user data store. In some embodiments in which the right hand is the area of interest, the body map includes a visual indication of skin conditions, such as dry patches, sun spots, etc., in relation to visual markers (fingers, knuckles of each finger, nails of each finger, etc.) of the hand. Such a body map can be output, e.g., displayed, to the subject via the user interface engine.

The example of the method 500 then proceeds to block 510, where an optional treatment protocol and/or product for each region of the area of interest is recommended based on the determined skin condition (e. g., acne, dry skin, age spots, etc.). In some embodiments, the recommendation engine 216 of the mobile computing device 104 or the recommendation engine 316 of the server computing system 108 recommends a treatment protocol and/or product for each region of the area of interest based on the facial/body map. In doing so, data can be accessed from the product data store 220, 320. Different products and/or treatment protocols can be recommended for regions with difference skin conditions. In the example above, areas around the knuckles and/or nails may have a different treatment protocol than areas on the back of the hand, for example. Or different spots on each finger or different spots on the same finger may require different treatments and/or product recommendations.

In some embodiments, the efficacy of the recommendation can be tracked, which can be used to train the recommendation engine and/or data stored in the product data store for improved recommendations in subsequent uses. The recommendations can be presented to the user 102 via the user interface engine 212 on display 202.

Of course, any processing accomplished at the mobile computing device 104 can be additionally or alternatively carried out at the server computing system 108.

The method 500 then proceeds to an end block and terminates.

The present application may reference quantities and numbers. Unless specifically stated, such quantities and numbers are not to be considered restrictive, but exemplary of the possible quantities or numbers associated with the present application. Further in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A method for assessing skin of a subject, comprising:
   calibrating a mobile device by scanning an area of interest in a set pattern;
   capturing, by a camera of the mobile device, one or more images of an area of interest at a distance D from the subject;
   capturing, by an inertial measurement unit of the mobile device, inertial measurement data of the mobile device contemporaneously with image capture;
   analyzing the captured images based on the inertial measurement data to determine location data, the location data representative of a location within the area of interest conveyed by each image at image capture, wherein analyzing the captured images based on the inertial measurement data includes using the inertial measurement data to determine position and orientation of the camera in relation to the area of interest at image capture and using a convolutional neural network to determine a location and identify a body part conveyed by the captured images; and
   analyzing the one or more images to determine one or more skin conditions associated with the area of interest.

2. The method of claim 1, further comprising
   generating a body map associated with the area of interest based on the location data and the analysis of the one or more images, the body map indicative of location and severity of the one or more skin conditions.

3. The method of claim 1, wherein said capturing, by the camera of the mobile device, the one or more images of the area of interest at the distance D from the subject includes capturing the one or more images at visible and non-visible wavelengths for permitting hyperspectral image processing.

4. The method of claim 3, further comprising
   emitting light, by a light source, at visible and non-visible wavelengths during image capture.

5. The method of claim 1, further comprising recommending a product for treatment of the one or more skin conditions.

6. The method of claim 1, wherein said capturing, by the camera of the mobile device, the one or more images includes scanning, with the mobile device, the area of interest for skin assessment.

7. The method of claim 1, further comprising
   controlling a light source to provide multiple lighting conditions.

8. The method of claim 1, further comprising:
   controlling light emissions from a plurality of regions of a lighting source; and
   conducting shadow analysis of the captured images to associate a topography with the area of interest.

* * * * *